United States Patent [19]

Ortega

[11] 4,420,338
[45] Dec. 13, 1983

[54] SCREEN-PRINTING INK

[75] Inventor: Francis Ortega, Brunoy, France

[73] Assignee: U.S. Philips Corporation, New York, N.Y.

[21] Appl. No.: 302,280

[22] Filed: Sep. 15, 1981

[30] Foreign Application Priority Data

Sep. 15, 1980 [FR] France ............... 80 19851

[51] Int. Cl.³ .................................. C09D 11/02
[52] U.S. Cl. ........................... 106/20; 106/26; 106/193 R; 252/521
[58] Field of Search ............ 106/20, 193 R, 26; 252/521

[56] References Cited

FOREIGN PATENT DOCUMENTS 8133 2/1980 European Pat. Off. .
1489031 10/1977 United Kingdom .
2021093 11/1979 United Kingdom .

Primary Examiner—Lorenzo B. Hayes
Attorney, Agent, or Firm—Norman N. Spain

[57] ABSTRACT

The invention relates to a screen-printing ink for producing a resistor by firing in a neutral atmosphere, comprising a mixture of one or more metalhexaborides, a temporary binder and a glass as the permanent binder, the glass being an alkaline earth borate or silicoborate which comprises a quantity of not more than 5 mole % of one or more metal oxides chosen from vanadium, molybdenum, niobium, tungsten, manganese, iron, zirconium and tantalum.

9 Claims, 4 Drawing Figures

SCREEN-PRINTING INK

The invention relates to a screen-printing ink for producing a resistor by firing in a neutral atmosphere, comprising a mixture of one or more metal hexaborides, a temporary binder and a glass as the permanent binder.

The invention is used in the field of microelectronics, particularly for producing electric circuits which are obtained by means of screen-printing and are fired in a neutral atmosphere, it being a requirement that for said circuits the pastes of different compositions are compatible with each other, especially with a conductive ink containing copper in accordance with GB Patent Specification No. 1.489.031.

A resistive ink which comprises a mixture of glass frit and one or more metal hexaborides is known from GB Patent Specification No. 2.021.093. Such an ink is highly compatible with the copper containing conductive ink on the copper containing as there is no reaction between the borides and the copper and furthermore the firing conditions are the same. But preparing a highly resistive ink requires a high content of glass which results in very negative values of the TCR (temperature coefficient of resistance).

In order to reduce the absolute value of the TCR of said highly resistive ink modifiers must also be added to the starting mixture. In accordance with a method disclosed in European Patent Specification No. 0 008 133 the modifiers are added to the organic vehicle. The modifiers employed must not react in a disturbing manner with the hexaborides and in particular must not be reduced by the hexaborides. Specific examples of modifiers of this type are, inter alia C, Si and Ge.

According to the invention, the modifiers are added to the glass phase. This measure has distinct advantages compared to the known measure, for the modifiers which are added to the glass phase are more uniform distributed and moreover this is the most important phase in material having a high resistance value.

Modifiers for the TCR have indeed already been proposed in the above-mentioned European Patent Specification in the form of a mixture or a mixed solid solution of metal hexaborides, such as strontium hexaboride, having a semiconducting character, with lanthanumhexaboride having a metallic character. If, however, the glass ratio becomes excessively large, the temperature coefficient is no longer influenced by this admixture and it becomes necessary to modify the nature of the glass phase.

The invention has for its object to provide such modifiers of the glass phase in order to reduce the absolute value of the TCR of the layer obtained after firing.

The screen-printing ink according to the invention is characterized in that the glass is an alkaline earth borate or a silicoborate which comprises a quantity of not more than 5 mol.% of one or more metal oxides chosen from the oxides of vanadium, molybdenum, niobium, tungsten, manganese, iron, zirconium and tantalum.

In this way the behaviour during firing of the glass phase is modified that the TCR of a screen-printed resistor having a resistance per square of 100 k$\Omega$, may be in the order of $\pm 100 \times 10^{-6}/°C$.

The choice of the hexaboride may vary to a rather large extent, for example a hexaboride of a bivalent metal, such as strontium ($SrB_6$), or a hexaboride of a trivalent metal, such as lanthanum ($LaB_6$) or a mixture, or a mixed solid solution, of hexaborides, which provides a means to influence the TCR of the semiconductor material may be employed.

In accordance with one embodiment of the invention the glass for layers having a resistance between 1 k$\Omega$ and 100 k$\Omega$ is a calcium borate to which one or more of the above-mentioned metal oxides are added and having the following composition in mole %:

$CaCO_3$: 30–35%
$B_2O_3$: 68–65%
Modifier oxides: 1–5%

The invention will now be further described by way of example with reference to the accompanying drawings.

Figure 1:
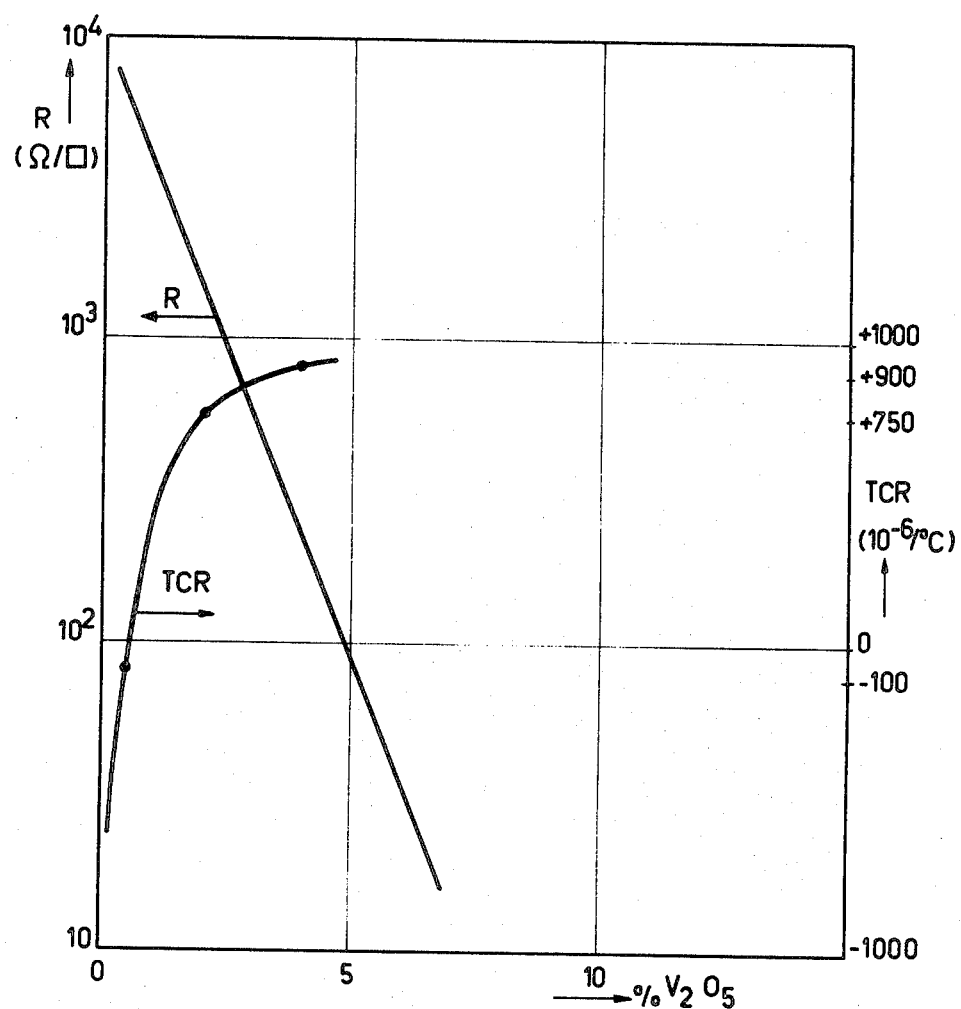
FIG. 1 shows two curves which illustrate the variation of the resistance and the temperature coefficient thereof (TCR), respectively for a resistor in which the glass is a calcium borate, to which vanadium oxide ($V_2O_5$) has been added, as a function of the vanadium oxide content in mole%.

The starting mixture used comprises predominantly a mixture of glass frit and of one or more metal borides. The glass consists of boron oxide ($B_2O_3$) and possibly silicon oxide ($SiO_2$) and an alkaline earth oxide, for example, CaO, BaO or SrO, modified by a quantity of not more than 5 mole% of one or more metal oxides chosen from oxides of vanadium, molybdenum, niobium, tungsten, manganese, iron, zirconium and tantalum.

The glass frit is obtained by means of double fusion, between 1300° C. and 1400° C. in accordance with methods which are customary in glass technology, by subsequent quenching and milling, for example in a ball mill, until a particle size of approximately 5 $\mu$m is obtained.

A metal hexaboride is also used in powder form, the particles of which are very hard and have a size of nearly 1 micron or less. Suitable metals may be bivalent metals such as calcium, strontium, barium or europium having a semiconducting character, or at least trivalent metals, such as lanthanum, samarium, or thorium having a metallic character; a mixed solid solution of metal hexaborides may alternatively be used.

Preferably, Applicants perform the synthesis of the hexaborides and more particularly of the mixed solid solutions of hexaborides by reduction by the boron, in vacuum, of the oxides of the relevant metals. A mixture of one or more metal oxide powders and boron is compressed under high pressure to form tablets and heated thereafter for some hours at a temperature above 1300° C. in vacuum. This process provides fine-grained ceramic materials which are thereafter pulverised by further milling.

The sign of the TCR of the material depends on the fact whether the material has a semiconductor or a metallic character. Metals have a positive TCR, which means that the resistivity increases versus the temperature, and which is explained by the fact that the ion network in which the free electrons participating in the conduction move, impedes this movement to a greater extent according as their speed of travel is higher. In contrast therewith semiconductors have a negative TCR which means that the resistivity decreases according as the temperature increases, which is explained by the fact that the thermal kinetic energy has a tendency to modify the distribution of the electron population from the valence band to the conduction band.

It is alternatively possible to mix a bivalent metal hexaboride and on at least trivalent metal hexaboride in such a way that the TCR is reduced to the lowest possible value or to realize by means of the above-described method a mixed solid solution of hexaborides, when the ion radii of the metal ions are compatible.

The glass frit powder and the powder of one or more hexaborides are then mixed, in different ratios depending on the desired resistance, in a ratio between 10/1 and 1/10. The mixtures comprising a large quantity of glass generally have a high resistivity and a negative TCR because of the glass, while the mixture comprising a small quantity of glass have a low resistivity and a TCR which is near the TCR of the semiconductor material.

A first means for reducing the TCR, as it is described in the prior mentioned GB Patent Specification No. 20 21 093 is milling the mixture for some hours, for example in a ball-mill. During milling the very hard hexaboride particles reduce the size of the glass particles from 5 micron to less than 0.01 micron. As a result thereof, after the manufacture of a screen-printed resistor the TCR will have been reduced by at least a factor of 10.

A second means consists in modifying the behaviour on firing the glass phase and is the object of the measure described hereafter.

An ink for a screen-printing procedure is prepared by dispersing the mixture of resistance material and glass powder in a temporary binder. Said temporary binder comprises a resin or polymer, such as methacrylates, methylmethacrylates, ethyl cellulose, a mixture of a solvent, a thickening agent, a plasticizer, for example terpineol, butylcarbitolacetate, etc., and a surface-active material and/or a lubricant, such as ethylene oxides, sodium lecithin, stearic acid or palmitic acid. Several admixtures may be added, such as stabilizers, very volatile liquids for rapid evaporation after screen-printing. A very suitable temporary binder is, for example, a solution of ethyl-cellulose in terpineol. The concentration of the binder may vary considerably and may amount to 80 percent by volume relative to the ink.

The organic binder has predominantly a rheologic function for printing through a screen-printing screen and the reproduction of the pattern contained therein and a binder function for bonding the hard materials on the substrate, which usually consists of aluminum oxide; finally, the binder must disappear during firing without carbonization and must not react in a disadvantageous manner with the solid part of the ink.

After screen-printing through a screen which usually is made of stainless steel, coated with an emulsion, followed by rapid drying and firing in a nitrogen atmosphere in an oven having several zones, so that a stepped temperature profile is obtained between 800° and 1000° C. for approximately 10 minutes, a screen-printed layer is obtained which serves as a resistance and the method of production of which is compatible with the method of producing the previously developed groups of copper conductors (GB Patent Specification No. 1,489,031) and of zinc and cobalt dielectric materials (EP Patent Application No. 2,416,498).

The resistors obtained in accordance with the above-described method must have a satisfactory resistance and also a hygroscopic and thermal stability. The resistance is not a determining factor, for it is possible to adjust it at a later moment by means of laser trimming. In contrast therewith, the stability is a decisive factor, particularly the stability of the electric properties of the layers. The hygroscopic stability is ensured by a suitable choice of the constituent parts, so the presence of oxides, such as barium oxide is not to be recommended. On the other hand, the addition of silicon oxide in a quantity which does not considerably alter the viscosity of the glass may have advantageous results without modifying the electric properties.

The control of the TCR must be the main object during the preparation of the ink. This coefficient is the more negative as the resistance is higher, due to a considerable proportion of glass. It is a general rule that resistors having an absolute value of the TCR of over $150 \times 10^{-6}/°C$. are not acceptable for micro-electronics.

Consequently, Applicants have been induced to add modifiers to the formulation of the inks, small quantities of said modifiers having already a satisfactory effect.

The modification of the electric properties of the metal hexaborides, for example when there is a properly balanced distribution of the bivalent and trivalent metal hexaborides, influences the electric properties of layer is obtained only to a very low extent, when the proportion of the glass is too excessive.

The electric conduction models in biphase systems glass (insulation)/metal (conductor) are rather complicated and there are at least three concepts:
1. Electric transport through conductor paths in accordance with the forward threshold value in any arbitrary heterogeneous environment;
2. Electric transport by electronic conduction (tunnel effect, electron jump or "hopping", . . . ) which enables the passage of electrons through thin thickness of an insulating coherent environment between conductive grains;
3. Electric transport through a conducting intergranular phase from a reaction between the original conductive particles and the glass phase or a combination of the above three possibilities.

The first possibility has for its result that the granulometry of the conducting particles is reduced, so that the forward threshold may be reduced.

The second possibility has for its result that either the electric characteristick of the permanent binder are modified by incorporating different constituent elements in the glass (of transition metals in particular), or that the thickness of the permanent binder is reduced by decreasing the granulometry of the glass particles, as described in the GB Patent Specification No. 2,021,093 mentioned before.

Finally, the third possibility results from the not obvious finding, that firing certain glass compositions comprising certain oxides of transition metals will entail a sign reversal of the TCR of the resistive layer obtained (weakly positive) relative to the TCR of the original starting elements (negative), which sign reversal is apparently caused by reaction between the two phases.

This apparently results in an intergranular conductive phase between the conductive particles of metal hexaborides.

These transition metal oxides having a surprising effect were selected by Applicants after a long series of experiments. The most important experiments will be described hereafter and form the following group: oxides of vanadium, molybdenum, niobium, tungsten, manganese, iron, zirconium and tantalum.

EXAMPLE 1

A number of resistors having an increasing vanadium content were produced in the following manner.

A calcium borate glass to which vanadium oxide was added was produced from a mixture of boron oxide ($B_2O_3$), calcium oxide (CaO obtained from $CaCO_3$) and vanadium oxide (in the form of $V_2O_5$) by double fusion, subsequent quenching and milling in a ball mill, in the following molar ratios: $B_2O_3(65-x/2)$, CaO $(35-x/2)$, $V_2O_3(x)$, wherein x may have values between 0 and 5.

The chosen hexaboride was a mixed solid solution $La_{0.2}Sr_{0.8}B_6$ and the screen-printing ink for a highly resistive composition was obtained by mixing the two powders in ratios by volume of 70% for the glass and 30% for the hexaboride respectively.

The organic binding was an ethyl cellulose solution in terpineol in a ratio by volume of 60% of the total mixture.

The resistive ink thus prepared was used for printing through an emulsion-coated, a 325 mesh stainless steel screen, dried at 125° C. for 10 minutes followed by firing in a neutral atmosphere (less than 10 ppm of oxygen) in a multi-zone oven.

FIG. 1 illustrates the variation of the resistance R in Ohm/□ and of the TCR of a layer, in dependence on the vanadium oxide content. At a zero vanadium oxide content the layer has a very high resistance and a highly negative TCR.

EXAMPLE 2

In a similar manner a screen-printing ink was prepared for a highly resistive composition starting from calcium borate glass to which tungsten which was added in the following molar ratios: CaO $(35-y/2)$, $B_2O_3(65-y/2)$ and $WO_3(y)$ and from a strontium hexaboride $SrB_6$.

The respective ratios by volume of the two phases in the said starting mixture were 70% for the glass and 30% for the hexaboride.

Figure 2:
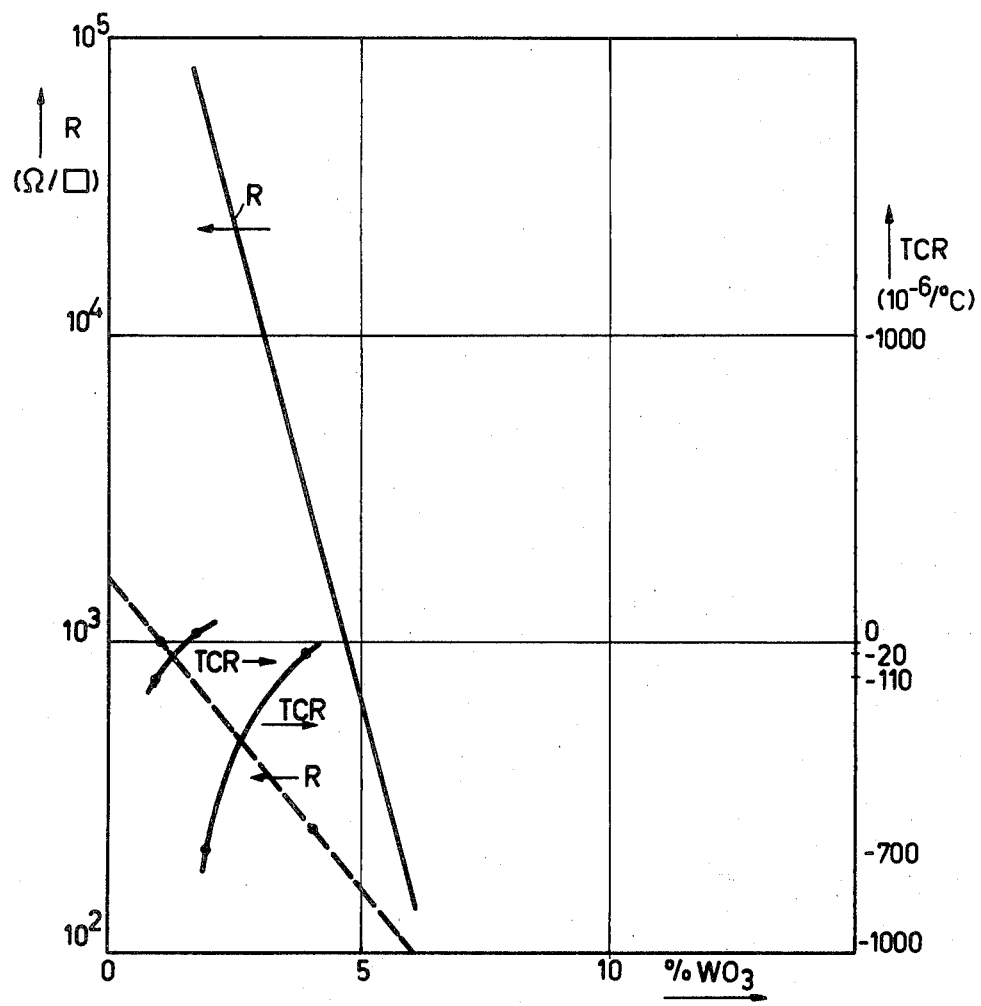
FIG. 2 shows similar curves which illustrate the variation of the resistance and the TCR for a resistor having the same glass, but now modified by tungsten oxide, as a function of the tungsten oxide content in mole.%.

After dispersion in a conventional organic binder, screen-printing, drying and firing, the electrical values in accordance with the solid curves of FIG. 2 were obtained, which illustrates the variation of the resistance R (Ohm/□) and of the TCR as a function of the percentage of tungsten oxide.

It should be noted that the strontium hexaboride is semiconducting and that its TCR is highly negative (see Table II of the French Patent Specification No. 2,397,704). The formation of a resistive layer, having a zero TCR or a weakly positive TCR by means of said doped glass can only be explained by the fact that reaction of the hexaboride with the modified glass phase occurs and that a phase is formed the electric properties of which differ from the electric properties of the starting mixture.

EXAMPLE 3

A similar screen-printing ink was prepared from a barium borate glass to which niobium oxide was added in the following molar ratios: BaO $(35-Z/2)$, $B_2O_3(65-Z/2)$ and $Nb_2O_5(Z)$ and from a strontium hexaboride.

The respective ratios of the two phases in the starting mixture were 70% glass and 30% hexaboride.

Figure 3:
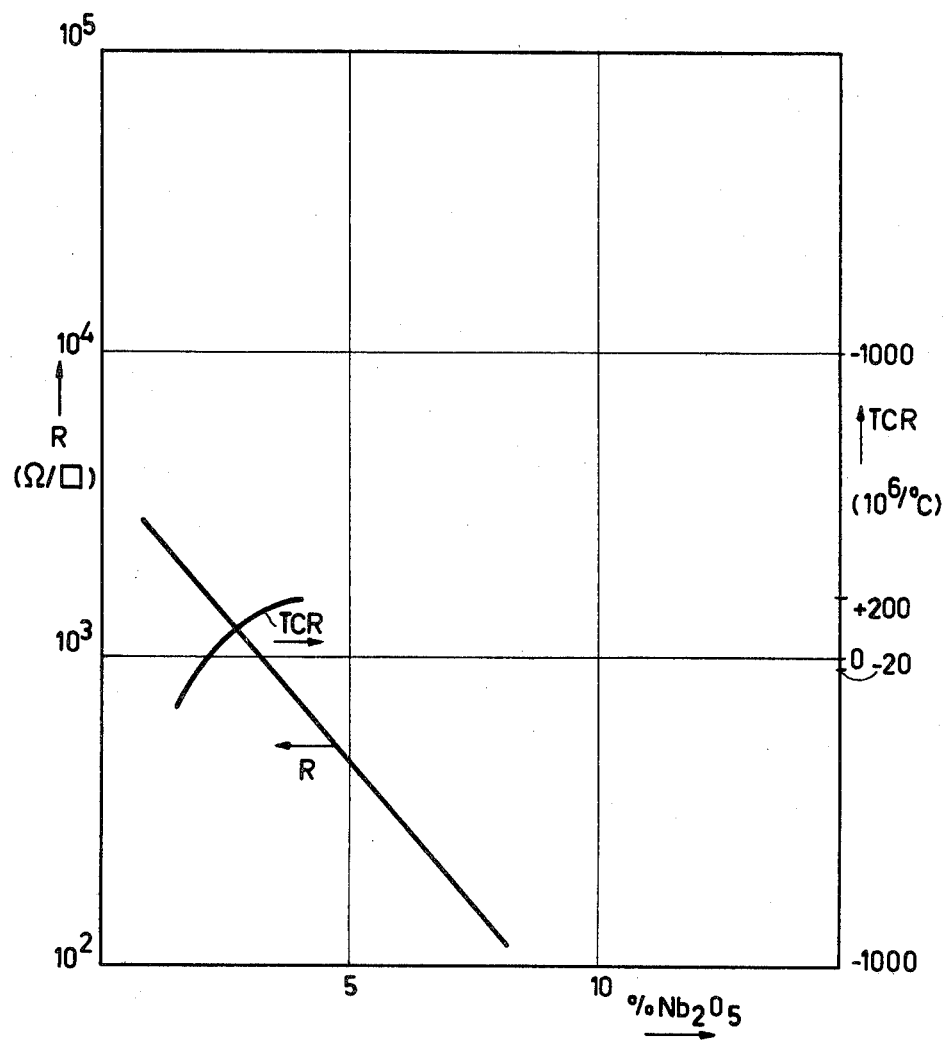
FIG. 3 shows similar curves which illustrate the variation of the resistance and of the TCR for a resistor having a barium borate glass modified by niobium oxide, as a function of the niobium oxide content in mole%.

After dispersion in a conventional organic binder, screen-printing, drying and firing in nitrogen, electric measurements were performed, as shown in FIG. 3 which illustrates the variation of the resistance $R(\Omega/\square)$ and of the TCR as a function of the percentage of niobium oxide.

EXAMPLE 4

A similar resistive ink as in FIG. 2 was prepared from a calcium borate glass to which tungsten oxide ($WO_3$) was added, the semiconducting material here being a lanthanum- and strontium-hexaboride in a mixed solid solution $La_{0.2}Sr_{0.8}B_6$.

The respective ratios by volume of the two phases in the said starting mixture were identical to those of Example 2.

After dispersion in a conventional organic binder, screen-printing, drying and firing the electric values were measured which, for the sake of comparison are illustrated in FIG. 2 (broken line curves).

It should be noted here that in spite of the important part of the modified glass phase in the final value of the resistor the semiconducting starting material (hexaboride) plays also a not unimportant part as in this example it reduces the value of the resistance by a factor of 10 relative to the mixture of FIG. 2.

EXAMPLE 5

A similar resistive ink was prepared from a calcium borate glass modified by a tantalum oxide, in the following molar ratios: CaO $(35-t/2)$, $B_2O_3(65-t/2)$ and $Ta_2O_5(t)$ and from strontium hexaboride.

The respective ratios by volume of the two phases in the starting mixtures were identical to those in the preceding examples.

Figure 4:
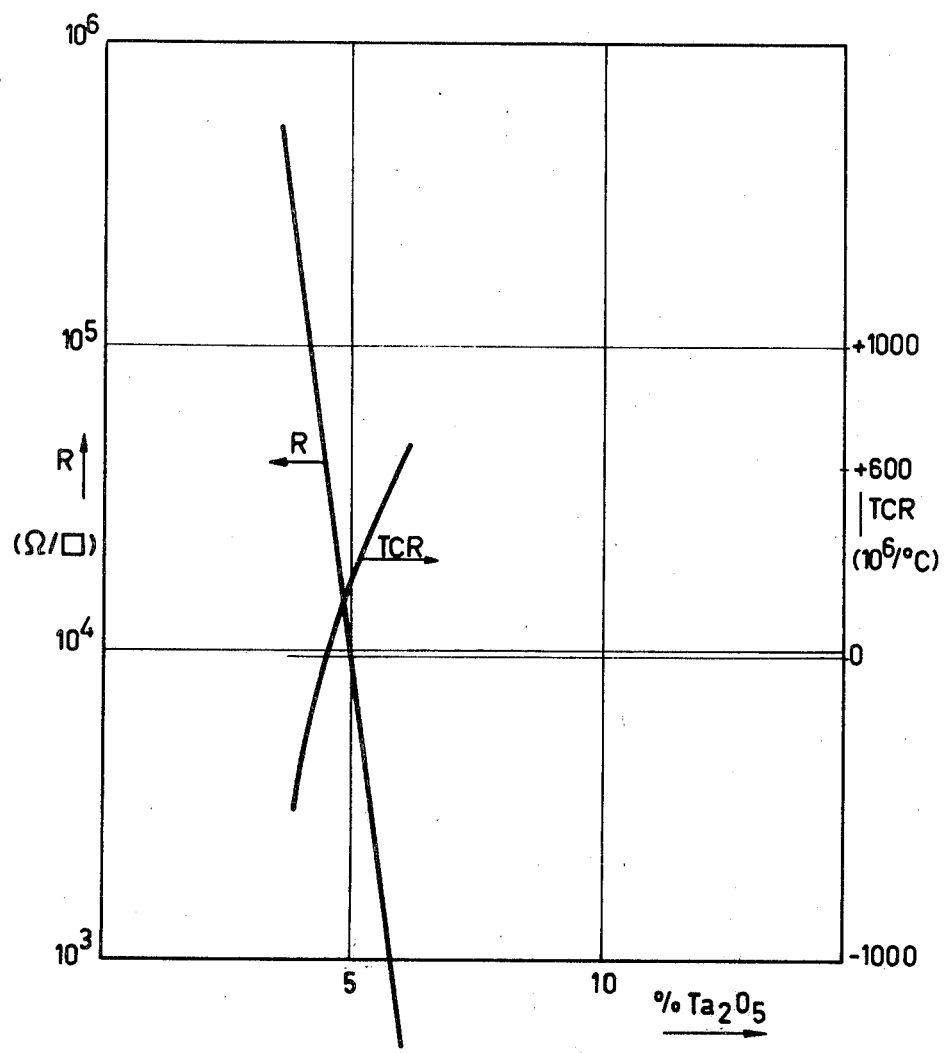
FIG. 4 shows similar curves which illustrate the variation of the resistance and of the TCR for a resistor having a calciumborate glass modified by tantalum oxide, as a function of the tantalum oxide content in mole%.

After dispersion in a conventional binder, screen-printing, drying and firing in nitrogen, electric measurements were performed and are shown in FIG. 4, which illustrates the variation of the resistance $R(\Omega/\square)$ and of the TCR as a function of the percentage of tantalum oxide.

EXAMPLE 6

In a particular embodiment of the invention Applicants wanted to check the principle which is well-known to a person skilled in the art in accordance with which conductive parts can be interrupted by introducing non-reactive insulating material, so that the resistance of the produced layer is increased.

In a system of the described type, based on hexaboride, this part is played by, for example, boron nitride in pulverulent form or by silicon nitride.

Measurements are performed on an output mixture prepared on the basis of a barium borate glass to which molybdenum oxide was added in the following molar ratios: BaO(24), $B_2O_3(63)$, $MoO_3(3)$, and a strontium hexaboride ($SrB_6$).

The respective ratios by volume of two phases in the said starting mixture are 75% for the glass and 25% for the hexaboride.

If the conductive material (SrB$_6$) is replaced by a mixture containing strontium hexaboride and boron nitride in increasing ratios the electric properties are significantly modified, as shown by the following Table of measured results.

| Percentages | | | | |
|---|---|---|---|---|
| Boron nitride | 0% | 30% | 40% | |
| | 20% | | | |
| SrB$_6$ | 100% | 80% | 70% | 60% |
| R/□ | 2kΩ | 2,5kΩ | 7kΩ | 15kΩ |
| TCR × 10$^{-6}$ | +150 | +130 | +50 | −35 |

It can now be seen, that the value of the resistance can be considerably increased while maintaining a satisfactory TCR.

What is claimed is:

1. A screen-printing ink for producing a TCR modifier containing resistor by firing in a neutral atmosphere, said ink comprising a mixture of one or more metalhexaborides, a temporary binder and a glass as the permanent binder, characterized in that the glass is an alkaline earth metal borate consisting of an alkaline earth metal oxide and boron oxide or an alkaline earth metal silicoborate consisting of an alkaline earth metal oxide, boron oxide and silicon dioxide which glass is modified by a quantity of not more than 5 mole% of one or more metal oxides selected from the group consisting of oxides of vanadium, molybdenum, niobium, tungsten, manganese, iron, zirconium and tantalum.

2. A screen-printing ink as claimed in claim 1, characterized in that the metal hexaboride is a bivalent metal hexaboride.

3. A screen-printing ink as claimed in claim 2, characterized in that the bivalent metal is strontium.

4. A screen-printing ink as claimed in claim 1, characterized in that the metal hexaboride is trivalent metal hexaboride.

5. A screen-printing ink as claimed in claim 4, characterized in that the trivalent metal is lanthanum.

6. A screen-printing ink as claimed in claim 1, containing a mixture of hexaborides of bivalent metals and trivalent metals.

7. A screen-printing ink as claimed in claim 1, containing a solid solution of hexaborides of bivalent metals and trivalent metals.

8. A screen-printing ink as claimed in claim 1, characterized in that the glass is calcium borate containing one or more of the modifier metal oxides in the following composition in mole%:

CaCO$_3$: 30 to 35%
B$_2$O$_3$: 60 to 65%
Modifier oxides: 1 to 5%

9. An ink for a screen-printing on a substrate and subsequent firing in a neutral atmosphere as claimed in any one of claims 1 to 8, characterized in that the temporary binder consists of a solution of methylcellulose in terpineol.

* * * * *